Aug. 18, 1925.  
W. J. WILLIS  
INDUSTRIAL TRUCK  
Filed April 25, 1923
1,549,945
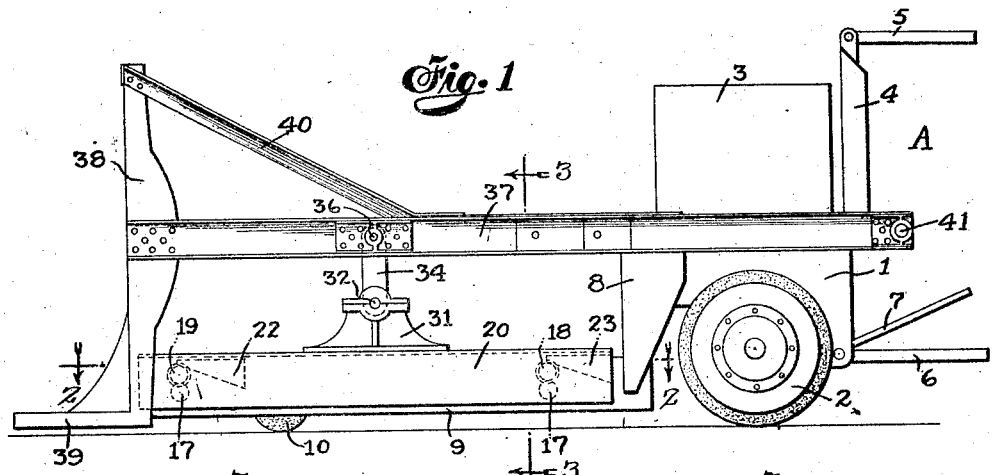
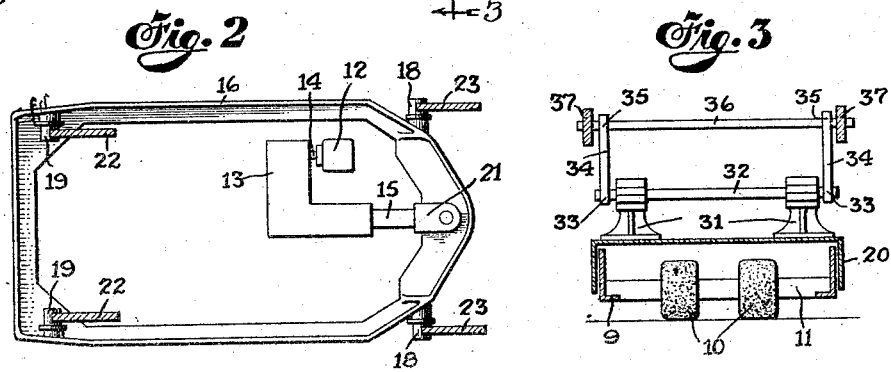
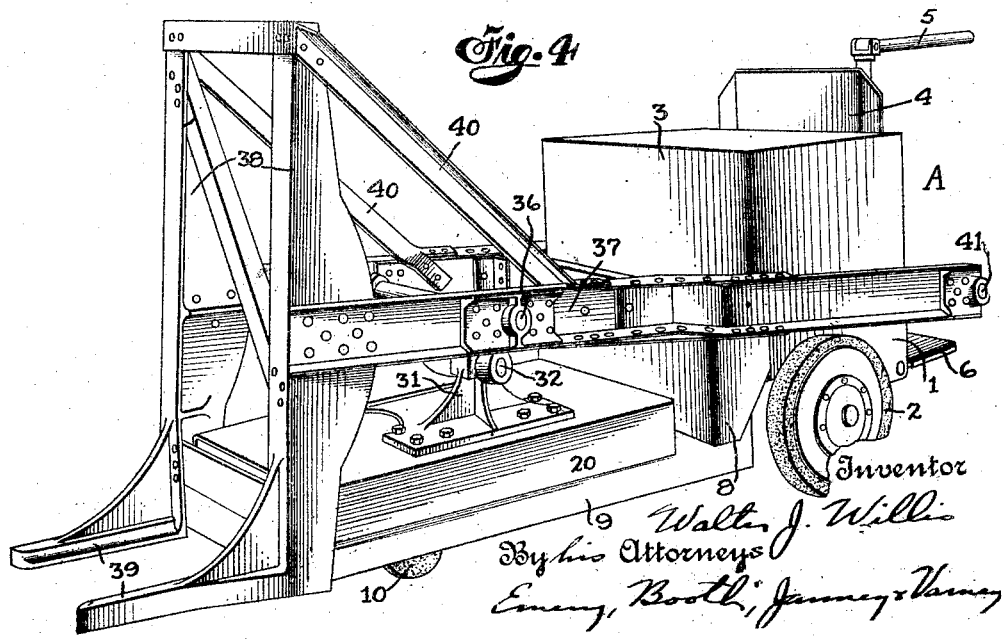

Patented Aug. 18, 1925.

1,549,945

UNITED STATES PATENT OFFICE.

WALTER J. WILLIS, OF LOCKPORT, NEW YORK.

INDUSTRIAL TRUCK.

Application filed April 25, 1923. Serial No. 634,488.

*To all whom it may concern:*

Be it known that I, WALTER J. WILLIS, a citizen of the United States, and resident of Lockport, county of Niagara, State of New York, have invented an Improvement in Industrial Trucks, of which the following is a specification.

This invention relates to industrial trucks, and more particularly to a special type of truck known as a charging truck, so called because it is specifically designed for placing stacks of pots in malleable iron annealing ovens. Of course, while this is the specific object of this type of truck, the device may be used for other suitable purposes where a lifting force is required.

Trucks of this general type have been specially designed and operated successfully, but the present invention relates to a mechanism for converting an ordinary type of lifting or elevating truck into a charging truck, and thus in effect having a single truck useful for both lifting and charging. The present invention, therefore, is an attachment for an ordinary type of lifting or elevating truck, and has as its object to provide a simple and effective means for combining the two.

The accompanying drawings show a truck combined with a preferred embodiment of the invention which has been selected for purposes of illustration, and therein, Figure 1 is a side elevation of a lifting truck showing the charging attachment combined therewith.

Figure 2 is a section on the line 2—2 of Figure 1 showing diagrammatically the platform elevating means of the lifting truck.

Figure 3 is a section on the line 3—3 of Figure 1 illustrating particularly the link mechanism.

Figure 4 is a perspective view of the lifting truck and charging attachment.

The lifting truck mechanism is designated generally by A and consists more particularly in a main frame 1 supported by the drive wheels 2. On the frame 1 is supported a suitable battery box 3, furnishing a source of power both for driving the truck and for operating the lifting mechanism. Projecting upwardly also from the main frame is a support in which is pivoted a suitable manually operated controlling lever 5. Projecting rearwardly from the main frame is a board 6 on which the operator may stand, and at a convenient point with respect thereto is pivoted the brake board 7 which is operatively connected in suitable manner with a brake band operating on the drive wheels 2.

Projecting forwardly from the main frame, and connected thereto by suitable bracket 8, is a frame 9 which is supported at the forward ends by the rollers 10 which are mounted on an axle 11 suitably connected to the frame 9.

Also supported on the frame 9 by suitable means is the elevating motor 12 which is operatively connected with the gear box 13 by a shaft 14. Suitable reducing gears are mounted in this box and connected therewith is a thrust nut 15 which is operated by suitable lift screw mechanism not shown. Mounted within the frame 9 is a roller frame 16 which is mounted for rolling engagement therewith on suitable rollers 17. On the upper side of the roller frame 16 are placed suitable rollers 18 and 19 which operate in a manner later described to impart elevating motion to the platform 20. The roller frame is operatively connected with the thrust nut 15 by a coupler 21, and it is therefore apparent that longitudinal motion of the thrust nut, imparted by suitable rotation of the motor 12, would impart to the roller frame a longitudinal motion.

On the under side of the platform 20 are fixed wedges 22 and 23 as shown in Figures 1 and 2, so placed as to cooperate with the rollers 18 and 19 before described. Longitudinal movement of the platform 20 with respect to the frame 9 is prevented by engagement therewith of suitable guides. When, therefore, longitudinal motion is imparted to the roller frame 16 by the motor 12 as described, the rollers 18 and 19 riding under the wedges 23 and 22 respectively will impart a vertical elevating motion to the platform.

The mechanisms thus far set out describe a well-known commercial elevating truck and are not, therefore, set out herein in further detail. The mechanisms now to be described are an attachment for the lifting truck previously described, or for other similar trucks having an elevating platform, and are designed to adapt such lifting trucks to perform the functions of a charging truck.

Mounted substantially in the center of the platform 20 are bracket members 31 in which is pivoted an axle 32. Suitably bushed to the axle 32 at 33 are link members 34, also bushed at 35 to the axle 36.

The main frame for the charging attachment consists of a pair of beams 37 at the outer end of which are a pair of vertical abutment members 38 provided at their lower ends with suitable lifting forks 39. Strengthening struts 40 are provided to prevent motion of the abutment member 38 with respect to the beam 37. The axle 36 before described is also pivoted to the beams 37 as shown in Figures 1 and 3. At their rear ends the beam members 37 are provided with suitable bushings to receive the axle 41 which is connected to the main frame 1.

As will be apparent, the whole charging frame is, therefore, capable of a limited pivotal motion with respect to the main frame, and this motion will be imparted thereto by the vertical motion of the platform 20 through the link mechanism just described. It will be observed that by placing the brackets substantially in the center of the platform the balance of the lifting truck is preserved, and at the same time the platform is permitted to exert its maximum lifting force. It is also desirable, although not essential, to place the axle 41 as far to the rear of the truck as possible, thus lengthening the leverage and giving the charging frame substantially the same lift as that of the platform. Should it be necessary in order to handle very heavy weights, however, a reduction in the angle of the wedges 22 and 23 will reduce the lift and thereby increase the power.

It is to be understood that the invention is not limited to the precise construction and mode of operation of the illustrative embodiment selected herein for purposes of illustration. For instance, other types of elevating trucks having different mechanisms for elevating a platform may be combined with this attachment. On the contrary, the invention may be variously modified and embodied within the scope of the subjoined claims.

I claim as my invention:

1. An attachment for a lifting truck having a moving platform, comprising, in combination, a frame, means to connect said frame to said truck, and means to connect said frame to said moving platform, whereby motion of the latter is transmitted to the former, including a pair of links pivotally connected to said frame and said platform.

2. An attachment for a lifting truck having a moving platform, comprising, in combination, a frame, means to pivot said frame to said truck, and link means connecting said frame and said moving platform, whereby motion of the latter is transmitted to the former.

3. The combination with a lifting truck having a moving platform, of a charging frame, means to pivot said frame to the truck, and means arranged substantially in the center of said elevating platform for applying motion thereof to said frame, whereby the balance of said truck is preserved.

4. The combination with a lifting truck having a moving platform, of a charging frame, having a pair of lift members at the forward end thereof; means to pivotally attach said frame at its rear end to the rear of the truck frame, and means intermediate said lift members and said pivotal attachment to connect said frame to said moving platform.

In testimony whereof, I have signed my name to this specification this 23rd day of April, 1923.

WALTER J. WILLIS.